United States Patent
Kuo et al.

(10) Patent No.: US 9,944,108 B2
(45) Date of Patent: Apr. 17, 2018

(54) STICKY NOTE PAD

(75) Inventors: Tsung-Tien Kuo, Kaohsiung (TW);
Jen-Rong Liu, Kaohsiung (TW);
Tsun-Rung Hsu, Kaohsiung (TW);
Ming-Yang Li, Nantou County (TW);
Chih-Wei Hsu, Kaohsiung (TW)

(73) Assignee: Taiwan Hopax Chemicals MFG. Co., Ltd., Kaohsiung (TW)

( * ) Notice: Subject to any disclaimer, the term of this patent is extended or adjusted under 35 U.S.C. 154(b) by 493 days.

(21) Appl. No.: 13/209,255

(22) Filed: Aug. 12, 2011

(65) Prior Publication Data

US 2012/0315420 A1 Dec. 13, 2012

(30) Foreign Application Priority Data

Jun. 10, 2011 (TW) .............................. 100120376 A

(51) Int. Cl.
*B32B 7/06* (2006.01)
*B32B 29/00* (2006.01)
*B32B 7/12* (2006.01)
*B42D 5/00* (2006.01)

(52) U.S. Cl.
CPC ................ *B42D 5/003* (2013.01); *C09J 7/21* (2018.01); *C09J 7/38* (2018.01); *C09J 2201/28* (2013.01); *C09J 2400/283* (2013.01); *Y10T 428/14* (2015.01); *Y10T 428/1405* (2015.01); *Y10T 428/1467* (2015.01)

(58) Field of Classification Search
CPC ...... B42D 5/00; B42D 5/003; C09J 2201/606; C09J 2201/36; C09J 2201/28; C09J 7/0207; C09J 7/045; G09F 3/10; G09F 3/08

USPC ................ 428/40.1, 42.1, 343, 352, 354
See application file for complete search history.

(56) References Cited

U.S. PATENT DOCUMENTS

| | | | |
|---|---|---|---|
| 5,622,761 A * | 4/1997 | Cole | 428/41.9 |
| 5,782,494 A | 7/1998 | Crandall et al. | 281/2 |
| 5,989,667 A * | 11/1999 | Tayebi | 428/40.1 |
| 6,187,432 B1 | 2/2001 | Krish et al. | 428/343 |
| 2002/0023336 A1* | 2/2002 | Weder | 29/469.5 |
| 2007/0172621 A1 | 7/2007 | Wittke | 428/40.1 |
| 2008/0113139 A1* | 5/2008 | Tokutsu et al. | 428/40.1 |

FOREIGN PATENT DOCUMENTS

| | | |
|---|---|---|
| DE | 9409930 U1 | 11/1994 |
| DE | 19513211 A1 | 10/1996 |
| DE | 102007000877 A1 | 5/2008 |
| EP | 0012789 A1 | 7/1980 |
| EP | 1547804 A1 | 6/2005 |
| TW | 472070 | 1/2002 |

(Continued)

OTHER PUBLICATIONS

Search Report dated Dec. 6, 2012 for European Patent Application No. 11177452.7.

(Continued)

*Primary Examiner* — Patricia L. Nordmeyer
(74) *Attorney, Agent, or Firm* — Ladas & Parry, LLP

(57) ABSTRACT

A sticky note pad includes a stack of note sheets. Each of the note sheets includes: a substrate having a writing face and a back face opposite to the writing face, the back face having a central portion and a peripheral portion surrounding the central portion; and an adhesive layer positioned on the central portion of the back face.

9 Claims, 10 Drawing Sheets

(56) References Cited

FOREIGN PATENT DOCUMENTS

TW           M339524       9/2008
TW           201249715 A1   12/2012

OTHER PUBLICATIONS

Office Action for related U.S. Appl. No. 13/492,838, dated Feb. 10, 2014.
Extended Search Report dated Oct. 23, 2012 for European Patent Appln. No. 12170767.3.
Office Action for related U.S. Appl. No. 13/492,838, dated May 15, 2014.
The Search Report appended in an Office Action issued to Taiwanese Counterpart Application No. 101101095, issued as TW 201249715, by the Taiwan Intellectual Property Office dated Jul. 14, 2014 along with an English translation provided by the applicants.

\* cited by examiner

STICKY NOTE PAD

CROSS-REFERENCE TO RELATED APPLICATIONS

This application claims priority to Taiwanese Patent Application No. 100120376 filed on Jun. 10, 2011, the disclosures of which is incorporated herein by reference.

BACKGROUND OF THE INVENTION

1. Field of the Invention

This invention relates to a sticky note pad that is re-attachable, more particularly to a sticky note pad having a stack of note sheets each of which is unlikely to warp and deform when the note sheet is torn off.

2. Description of the Related Art

Referring to FIG. 1, a conventional sticky note pad 1 includes a plurality of note sheets 12, each of which has a back face coated with an adhesive layer 11 at a first end 122 of the back face. When tearing the note sheet 12 from the remaining note sheets 12, the tearing direction is from a second end 121 of the note sheet 12 that is distal from the adhesive layer 11 toward the first end 122 that is coated with the adhesive layer 11. During the tearing operation, the stress applied to the note sheet 12 accumulates at the first end 122 so that the second end 121 of the note sheet 12 becomes warped before the note sheet 12 is separated from the remaining note sheets 12. After the note sheet 12 is completely torn off, recovery of the note sheet 12 from warp is unlikely. Hence, after the note sheet 12 is stuck to an article, the second end 121 of the note sheet 12 tends to warp upwardly and may be folded when an external force is applied to the note sheet 12.

Furthermore, the warped note sheet 12 stuck to a page of a document is likely to fall off when an additional article, e.g., paper, is inserted into the same page of the document. The warped note sheet 12 is also likely to be attached to the inserted article.

Besides, the adhesive layer 11 is strip-shaped, and the covering area of the adhesive layer 11 is about 20% based on a surface area of the note sheet 12. It is well known that when the area of the adhesive layer 11 is increased, the adhesion of the note sheet 12 to an article can be improved. However, the amount of the adhesive for forming the adhesive layer 11 will be increased, accordingly.

Therefore, in order to overcome the warp problem and to reduce the amount of the adhesive without adversely affecting the adhesion ability of the note sheet 12, the conventional note pad 1 needs further improvement.

SUMMARY OF THE INVENTION

Therefore, an object of the present invention is to provide a sticky note pad that can overcome the aforesaid drawbacks associated with the prior art.

Accordingly, a sticky note pad of this invention comprises:
- a stack of note sheets each of which includes:
- a substrate having a writing face and a back face opposite to the writing face, the back face having a central portion and a peripheral portion surrounding the central portion; and
- an adhesive layer positioned on the central portion of the back face.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
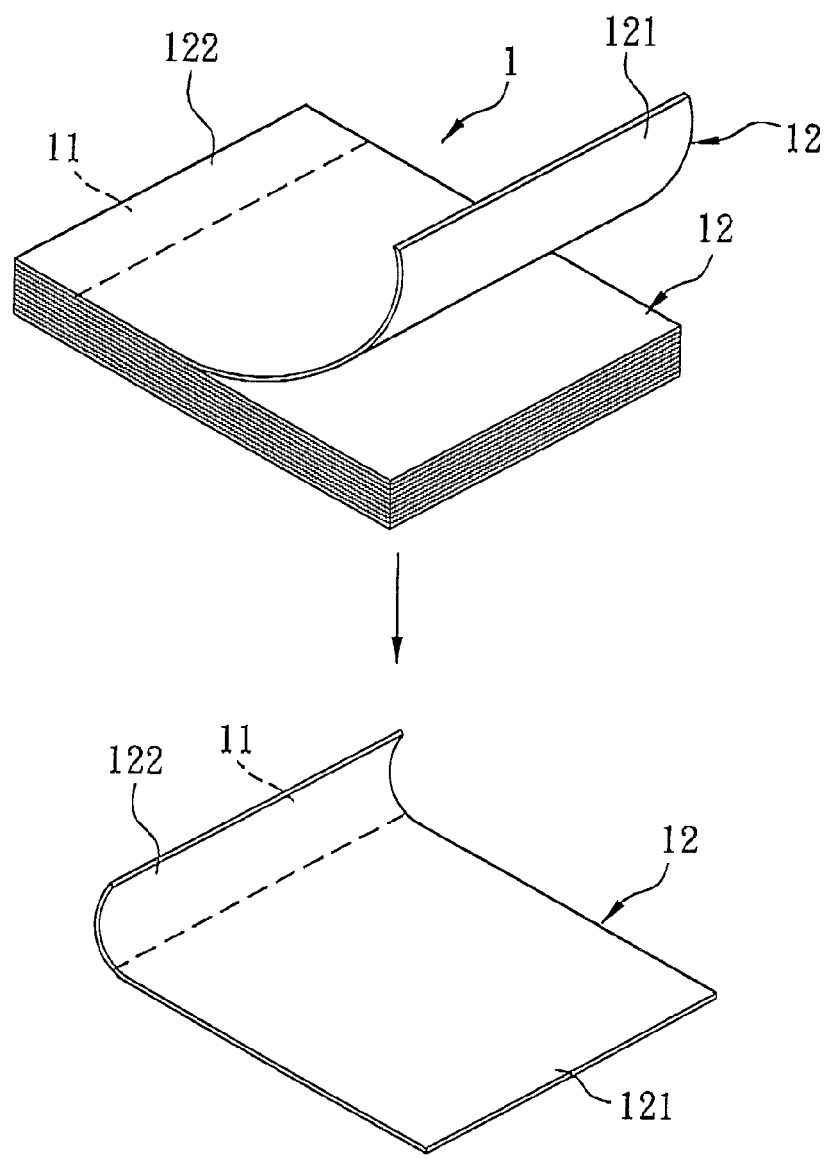
FIG. 1 is a schematic view illustrating a note sheet being torn off from remaining note sheets of a conventional sticky note pad.

Before the present invention is described in greater detail with reference to the accompanying preferred embodiments, it should be noted herein that like elements are denoted by the same reference numerals throughout the disclosure.

Figure 2:
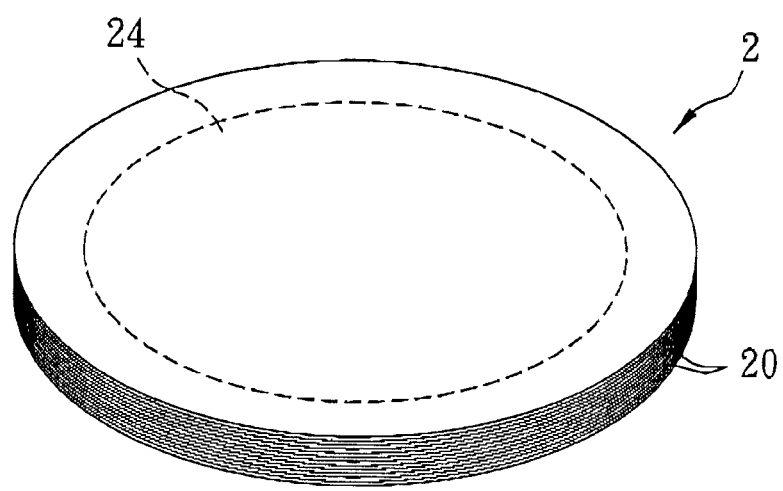
FIG. 2 is a schematic view of the first preferred embodiment of a sticky note pad according to this invention.
Figure 3:
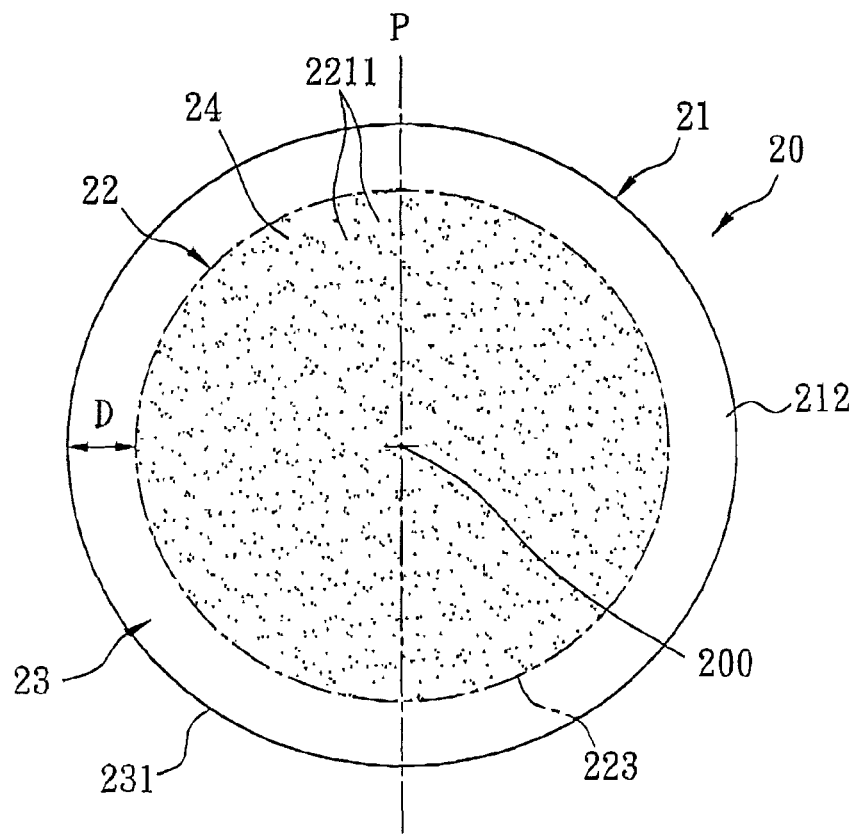
FIG. 3 is a bottom view of a note sheet of the sticky note pad shown in FIG. 2.

Referring to FIGS. 2 and 3, the first preferred embodiment of a sticky note pad 2 according to this invention comprises a stack of note sheets 20 each of which includes a circular substrate 21 and an adhesive layer 24.

Figure 4:
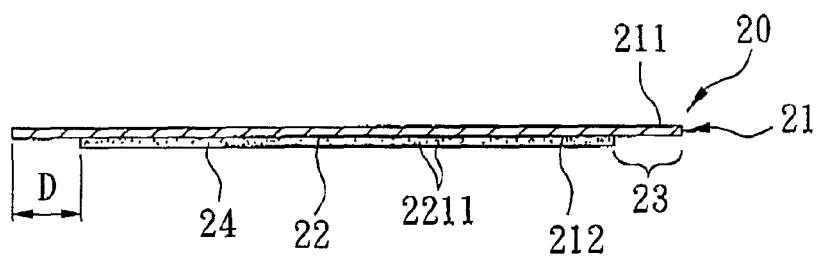
FIG. 4 is a cross-sectional view of the note sheet shown in FIG. 3.

Referring to FIGS. 3 and 4, the substrate 21 of each note sheet 20 has a writing face 211 and a back face 212 opposite to the writing face 211. The back face 212 has a central portion 22 and a peripheral portion 23 surrounding the central portion 22. In each note sheet 20, the adhesive layer 24 is positioned on the central portion 22 of the back face 212. In this embodiment, the adhesive layer 24 covers an entire area of the central portion 22 of the back face 212. It should be noted that although the substrate 21 and the adhesive layer 24 are circular in this embodiment, they may be formed into other shapes based on actual requirements.

The peripheral portion 23 has an outer periphery 231. The outer periphery 231 is also a periphery of the back face 212. The central portion 22 has a looped boundary 223 which is a demarcation line between the peripheral portion 23 and the central portion 22. The back face 212 has a shortest line (P) passing through a center 200 of the back face 212 (see FIG. 3). When a length of the shortest line (P) from one point to an opposite point of the outer periphery 231 of the peripheral portion 23 is greater than 20 mm, a shortest distance (D) between the outer periphery 231 of the peripheral portion 23 and the looped boundary 223 of the central portion 22 is greater than 5 mm. In addition, the percentage of an area of the central portion 22 ranges from 20% to 99% based on an area of the back face 212. The area of the back face 212 includes the area of the central portion 22 and an area of the peripheral portion 23. In this embodiment, the area of the central portion 22 is equal to an area of the adhesive layer 24.

In each note sheet 20, the adhesive layer 24 includes a plurality of colloid particles 2211 (i.e., an adhesive material for forming the adhesive layer 24 is a microsphere adhesive), and the colloid particles 2211 have an average particle size ranging from 10 to 120 microns, preferably from 30 to 120 microns. Alternatively, the adhesive layer 24 may be formed by a non-particle adhesive gel. The adhesive layer 24 is made from a pressure-sensitive adhesive. Accordingly, the note sheet 20 is re-attachable.

By forming the adhesive layer 24 in the central portion 22 that is spaced apart from the outer periphery 231 of the peripheral portion 23, stress will not accumulate at an edge of the substrate 21. Thus, warp of the note sheet 20 can be alleviated.

Figure 5:
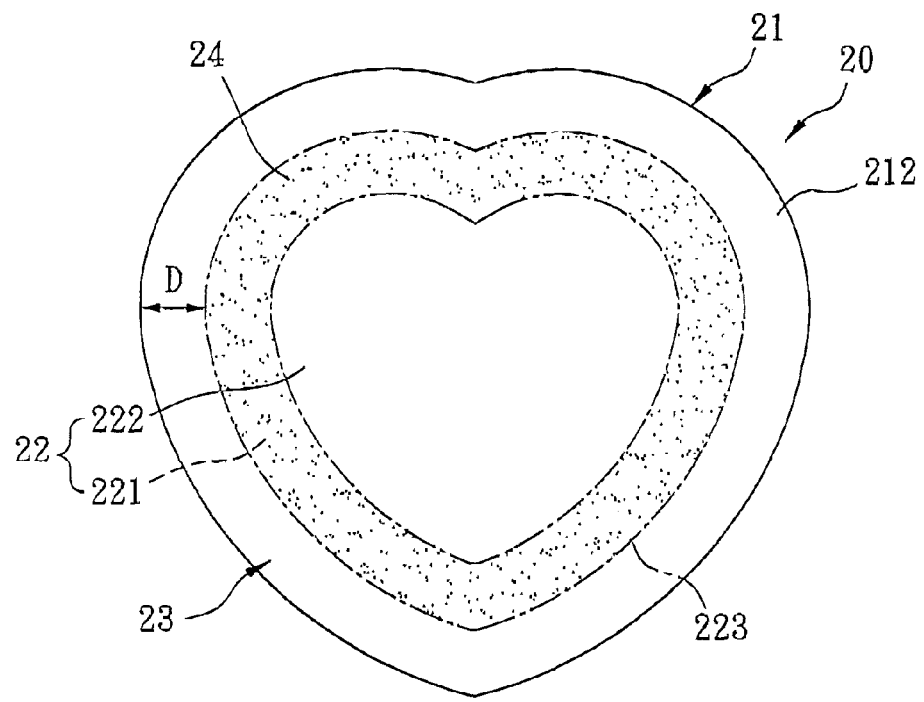
FIG. 5 is a bottom view of the second preferred embodiment of a note sheet of a sticky note pad according to this invention.
Figure 6:
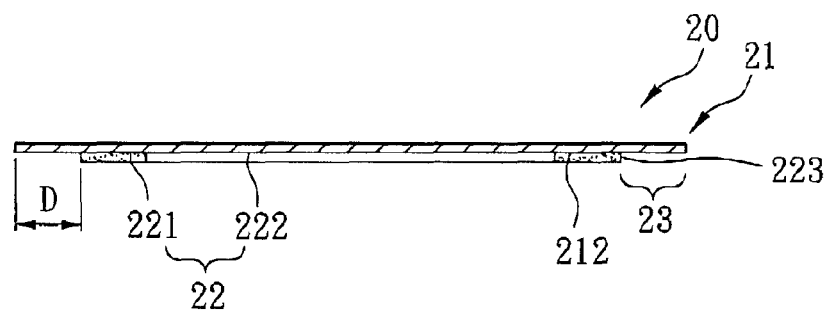
FIG. 6 is a cross-sectional view of the note sheet shown in FIG. 5.

FIGS. 5 and 6 illustrate the second preferred embodiment of a note sheet 20 of a note pad (not shown) according to the invention. The second preferred embodiment differs from the first preferred embodiment in that the substrate 21 is heart-shaped and that the central portion 22 of the back face 212 includes a non-adhesion region 222 and an adhesion region 221. The adhesion region 221 is formed along the looped boundary 223, is disposed between the non-adhesion region 222 and the peripheral portion 23, and surrounds the non-adhesion region 222. The adhesive layer 24 is formed on an entire area of the adhesion region 221 of the central portion 22 of the back face 221.

Figure 7:
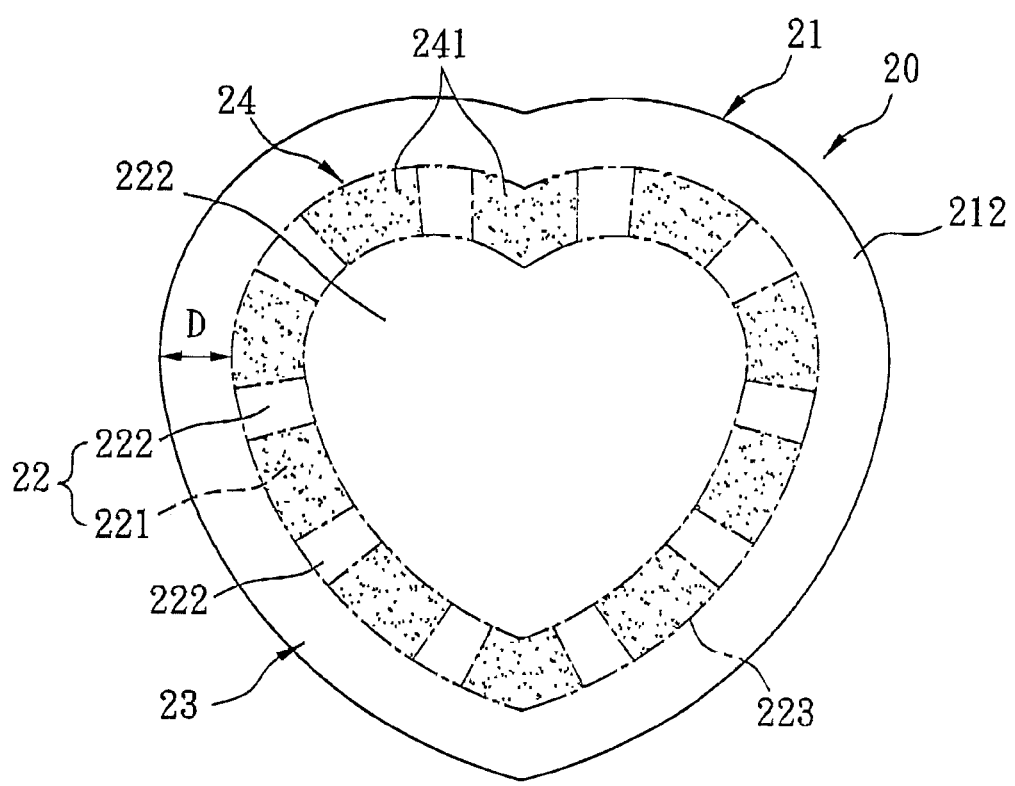
FIG. 7 is a bottom view illustrating the third preferred embodiment of a note sheet of a sticky note pad according to this invention, in which an adhesive layer has a plurality of spaced apart adhesive material units.

FIG. 7 illustrates the third preferred embodiment of a note sheet 20 of a note pad (not shown) according to the invention. The third preferred embodiment differs from the first preferred embodiment in that the substrate 21 is heart-shaped, and that the central portion 22 of the back face 212 includes a plurality of spaced apart adhesion regions 221 that are formed along the looped boundary 223, and a non-adhesion region 222 formed among the adhesion regions 221 within the looped boundary 223. The adhesive layer 24 includes a plurality of adhesive material units 241 respectively disposed on the adhesion regions 221.

In the second and third embodiments, because the adhesive layers 24 are in the form of continuous and discontinuous strips respectively, the amount of the adhesive for the adhesive layer 24 can be reduced as compared with that of the first embodiment, thereby minimizing the cost for forming the note pad 20 of this invention.

Experiment

Adhesive tests were conducted to determine the influence of the position of the adhesive layer 24 on the back face 212 of the substrate 21 and the particle size of the colloid particles 2211 on the adhesion property of the note sheet 20.

Formation of the adhesive layer 24 is briefly described below. In a four-port reactor (5-liter) that was provided with a stirrer, a condenser and a thermometer, 80 grams of polyacrylic acid as a dispenser, 30 grams of sodium dodecyl sulfate (SDS), and 2500 grams of deionized water were added. In another container (e.g., a flask), 5 grams of benzoyl peroxide (BPO) was evenly dissolved in 1200 grams of 2-ethylhexyl acrylate (2-EHA) and 40 grams of acrylic acid (AA) so as to obtain a mixture. Thereafter, the mixture was poured into the reactor with stirring, and was mixed with the components in the reactor at a stirring rate of 5000 rpm for 15 minutes.

Next, the temperature in the reactor was raised to and kept at 70° C. for 2 hours. Then, the temperature naturally rose to 95° C. attributed to an exothermic reaction. After the temperature dropped to 70° C., the reactor was maintained at 70° C. for 8 hours. After the reaction was complete, the reactor was cooled to room temperature, followed by filtering so as to obtain an adhesive material. The adhesive material includes a plurality of the colloid particles 2211 having an average particle size of about 45 microns. Since the structures of the reactor, the stirrer, the condenser and the thermometer are well-known in the art, the same are not described herein for the sake of brevity.

Experiment 1

In this experiment, the adhesive layer 24 was formed using the aforesaid adhesive material.

Figure 8A:
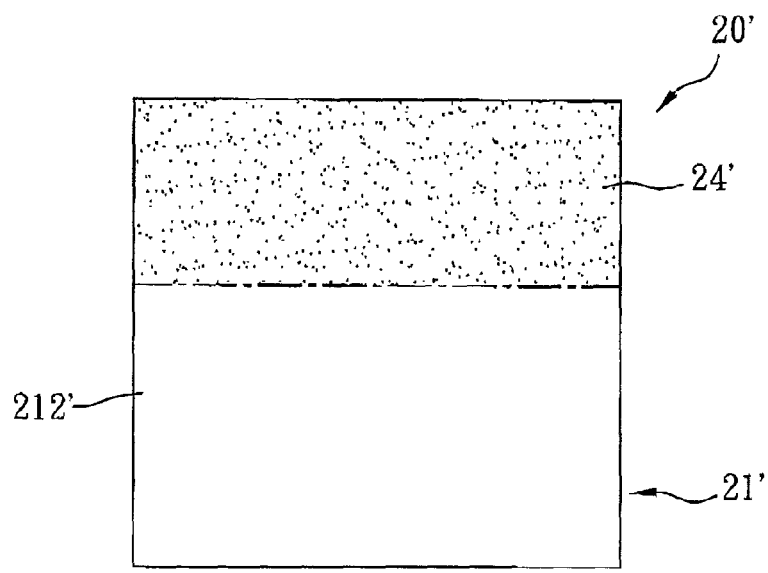
FIG. 8(a) is a bottom view illustrating a conventional sticky note sheet that is used as a comparative group in an adhesion test of Experiment 1, in which an adhesive layer is formed along an edge of a substrate.

In a comparative group (see FIG. 8(a)), the substrate 21' had a size of 30 mm×30 mm, and the adhesive material was coated along an edge of the back face 212' of the substrate 21', followed by drying at 100° C. so as to form the adhesive layer 24', thereby obtaining the note sheet 20'. In the comparative group, the adhesive layer 24' was not spaced apart from a periphery of the back face 212' of the substrate 21' and had a width of 11.88 mm and a length of 30 mm.

The area of the back face=30 mm×30 mm=900 mm$^2$

The coating area of the adhesive layer=11.88 mm×30 mm=356.4 mm$^2$

The percentage of the area of the adhesive layer= (the area of the adhesive layer/the area of the back face)×100%=(356.4 mm$^2$/900 mm$^2$)× 100%=39.6%

Figure 8B:
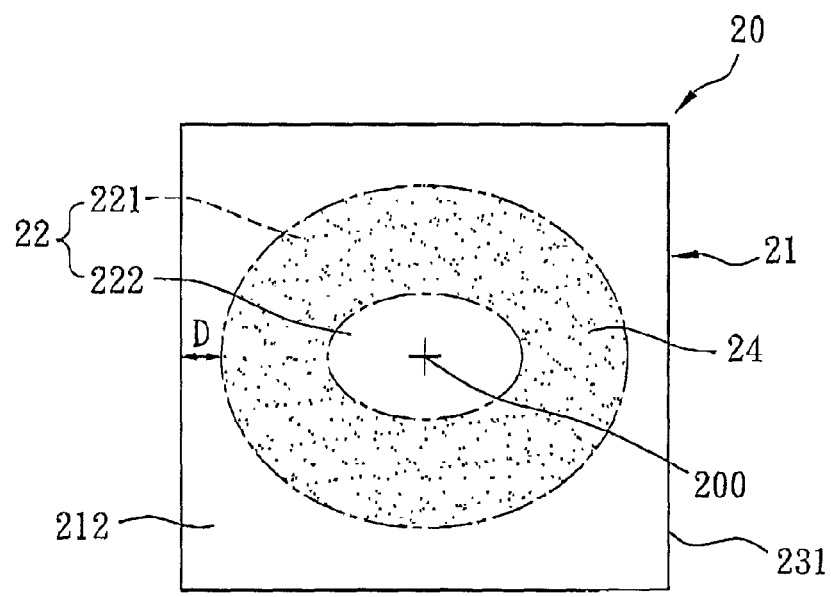
FIG. 8(b) is a bottom view illustrating a sticky note sheet of this invention that is used as an experimental group in an adhesion test of Experiment 1, in which an adhesive layer is formed in a central portion that is spaced apart from a periphery of a substrate.

In an experimental group (see FIG. 8(b)), the note sheet 21 had a structure similar to that of the second preferred embodiment except that the note sheet 20 was in the form of square and the central portion 22 was oval in shape. A maximum diameter of the adhesion region 221 from the center 200 of the back face 212 was 25 mm and a minimum diameter of the adhesion region 221 from the center 200 of the back face 212 was 22 mm. A maximum diameter of the non-adhesion region 222 from the center 200 of the back face 212 was 12 mm and a minimum diameter of the non-adhesion region 222 from the center 200 of the back face 212 was 8 mm. The substrate 21 also had a size of 30 mm×30 mm, and the adhesive material was formed on an entire area of the adhesion region 221 of the central portion 22, followed by drying at 100° C. to form the adhesive layer 24, thereby obtaining the note sheet 20. In the experimental group, the adhesive layer 24 was spaced apart from the periphery 231 of the substrate 21. The area of the adhesive layer 24 was equal to the area of the adhesion region 221.

The area covered and surrounded by the adhesive layer 24 was equal to the area of the central portion 22. The percentage of the area covered and surrounded by the adhesive layer 24, i.e., the area of the central portion 22, based on the area of the back face 212 is referred to as an enclosing percentage of the adhesive layer 24.

The area of the back face=30 mm×30 mm=900 mm²

The coating area of the adhesive layer=(22 mm×25 mm÷4×π)−(8 mm×12 mm÷4×π)=431.8 mm²−75.4 mm²=356.4 mm²

The area covered and surrounded by the adhesive layer the area of the central portion=22 mm×25 mm÷4×π=431.8 mm²

The enclosing percentage of the adhesive layer 24= (the area of the central portion/the area of the back face)×100%=(431.8 mm²/900 mm²)×100%=47.9%

It should be noted that although the coating areas of the adhesive layers 24', 24 in the comparative and experimental groups are the same, the enclosing percentage (47.9%) of the adhesive layer 24 in the experimental group is greater than that of the comparative group (39.6%).

The adhesion test was evaluated by deformation percentage of the note sheet 20 after the note sheet 20 was stuck to an object for 16 hours. Six different objects were used for the adhesion test, i.e., a storage box made of low density polyethylene (LDPE), a storage box made of high density polyethylene (HDPE), a beverage cup made of polypropylene (PP), a wood board, a transparent folder made of PP, and a flannel screen.

Figure 9:
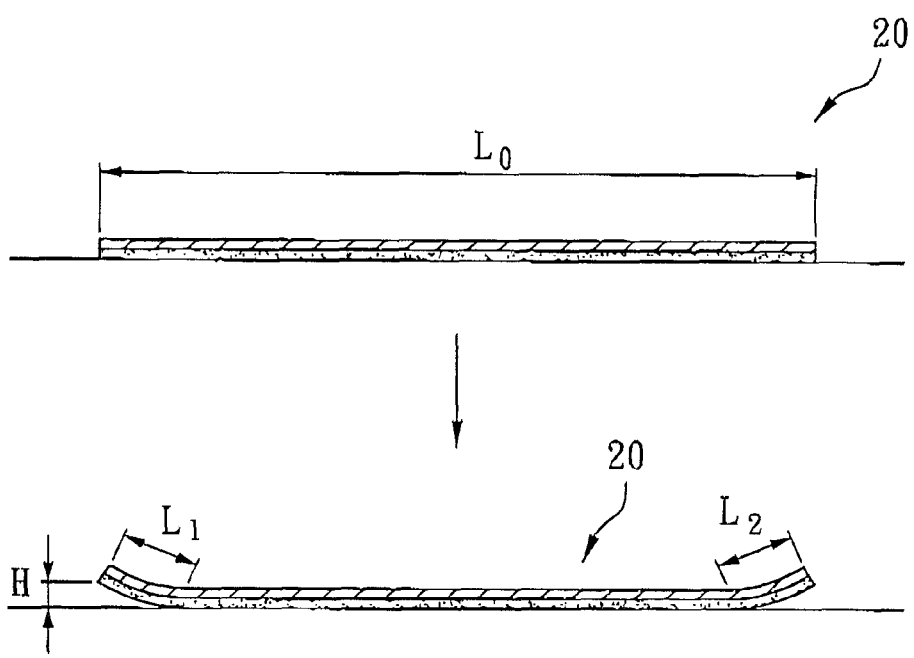
FIG. 9 is a schematic view illustrating the deformation of the note sheet and the parameters (H, $L_1$, and $L_2$) used to determine a deformation percentage of the note sheet in Experiment 1.

Referring to FIG. 9, after the note sheet 20 was stuck to one of the aforesaid objects for 16 hours, it was observed whether or not two opposite edges in a longitudinal direction, i.e., the length direction, of the note sheet 20 were warped. When a warp height (H) of an edge of the note sheet 20 from a surface of the object is greater than 2 mm, it is regarded as deformation. The warp length ($L_1$, $L_2$) of the note sheet 20 at each of the opposite edges thereof in the length direction is the length of a portion of the note sheet 20 that is detached from the object at each of the opposite edges. The note sheet 20 in the length direction has a length ($L_0$). The deformation percentage is defined as follows:

The deformation percentage=$(L_1+L_2)/L_0 \times 100\%$

The higher the deformation percentage of the note sheet, the lower is the adhesion ability thereof. When the deformation percentage is 100%, it means that the note sheet 20 has completely fallen off.

From the results shown in Table 1, it can be known that, by spacing apart the adhesive layer 24 from the outer periphery 231 of the back face 212, the deformation percentage of the note sheet 20 can be effectively reduced. Besides, the adhesion ability is actually improved by increasing the enclosing percentage of the adhesive layer 24.

TABLE 1

Adhesion ability of the adhesive layer with respect to the formed position on the note sheet

|  | Comparative Group | Experimental Group |
| --- | --- | --- |
| Storage box (LDPE) | 15% | 0% |
| Storage box (HDPE) | 30% | 0% |
| Beverage cup (PP) | 87% | 55% |

TABLE 1-continued

Adhesion ability of the adhesive layer with respect to the formed position on the note sheet

|  | Comparative Group | Experimental Group |
| --- | --- | --- |
| Wood board | 0% | 0% |
| Transparent folder (PP) | 0% | 0% |
| Flannel screen | 100% | 65% |

Experiment 2

In the aforesaid process for forming the adhesive material of this experiment, the stirring rate was controlled at 550 rpm, 500 rpm, 400 rpm, 280 rpm and 240 rpm to obtain colloid particles 2211 having an average particle size of 30 microns, 45 microns, 60 microns, 100 microns, and 120 microns, respectively. The adhesive material was coated on the back face 212 of the note sheet 20 in the same way as that disclosed in the experimental group of Experiment 1 to form the adhesive layer 24 that had a coating area of 356.4 mm².

In this experiment, the object for the adhesion test was a marble plate with a rough surface. The test results are shown in Table 2.

TABLE 2

Adhesion ability of the adhesive layer with respect to the average particle size of the colloid particles

|  | Ex. 1 | Ex. 2 | Ex. 3 | Ex. 4 | Ex. 5 |
| --- | --- | --- | --- | --- | --- |
| Average particle size of the colloid particles(microns) | 30 | 45 | 60 | 100 | 120 |
| Time duration* (hour) | 0.5 | 3 | 5 | 5.5 | 6 |

*Time duration that elapses from the beginning of sticking the note sheet 20 to the rough surface of the marble plate to a time that allows the note sheet to fall off from the marble plate From the results shown in Table 2, the time duration of the note sheet 20 increases with the increase in the average particle size of the colloid particles 2211 in the adhesive layer 24. Therefore, the results demonstrate a positive correlation between the average particle size of the colloid particles 2211 and the time duration of the note sheet 20.

Figure 10:
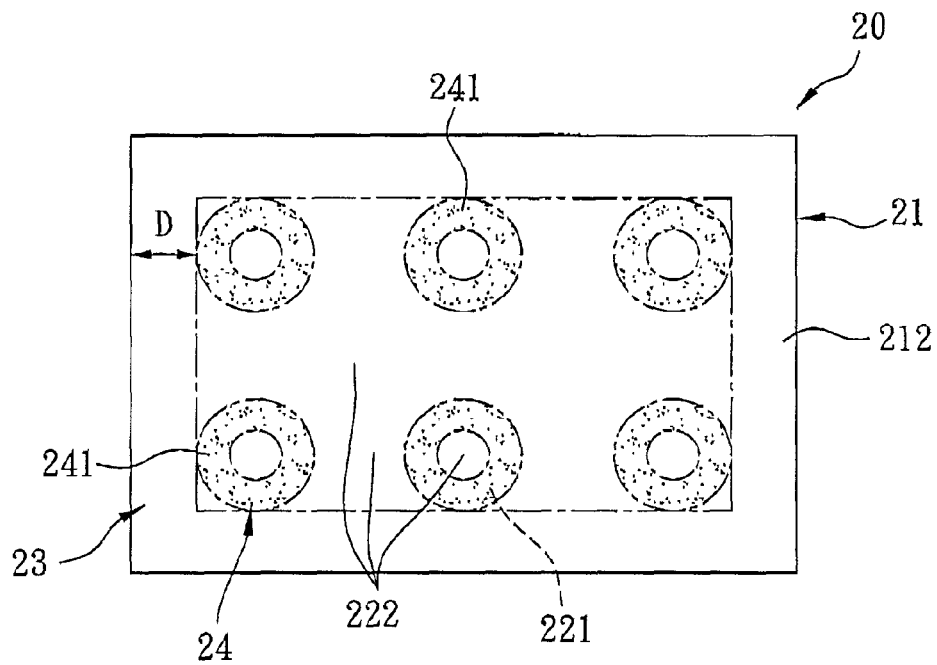
FIG. 10 is a bottom view of the fourth preferred embodiment of a note sheet of a sticky note pad according to this invention.
Figure 11:
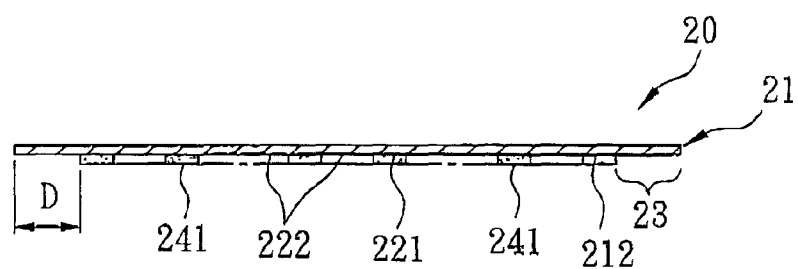
FIG. 11 is a cross-sectional view of the note sheet shown in FIG. 10.
Figure 12:
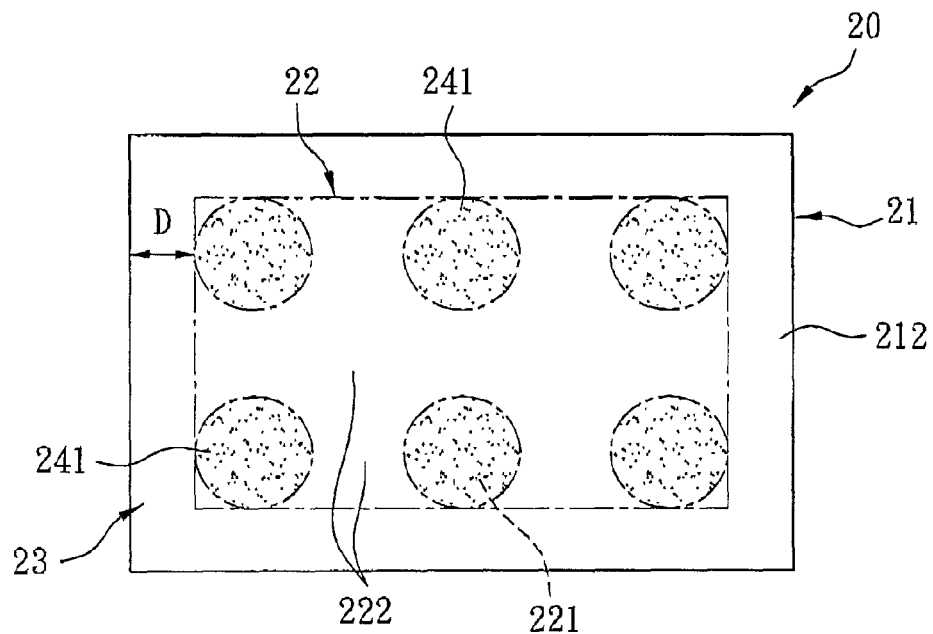
FIG. 12 is a bottom view illustrating a modified configuration of the fourth preferred embodiment.
Figure 13:
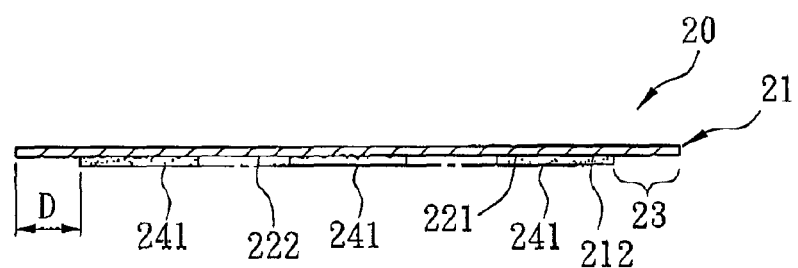
FIG. 13 is a cross-sectional view of the note sheet shown in FIG. 12.

FIGS. 10 and 11 illustrate the fourth preferred embodiment of a note sheet 20 of a note pad (not shown) according to this invention. The fourth preferred embodiment differs from the third preferred embodiment in that the substrate 21 is rectangular and that each of the adhesive material units 241 is in a form of a ring. Alternatively, each of the adhesive material units 241 may be circular (see FIGS. 12 and 13). In these two configurations, the amount of the adhesive for forming the adhesive layer 24 can be further reduced compared to the previous embodiments.

Figure 14:
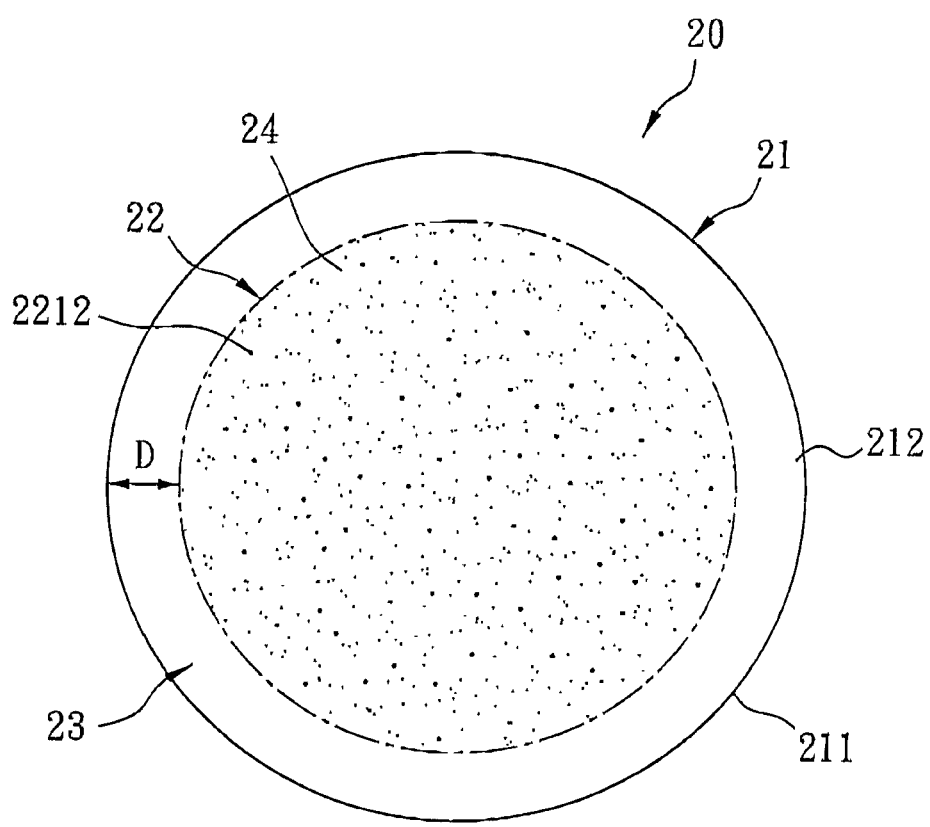
FIG. 14 is a bottom view of the fifth preferred embodiment of a note sheet of a sticky note pad according to this invention.

FIG. 14 illustrates the fifth preferred embodiment of a note sheet 20 of a note pad (not shown) according to this invention. The fifth preferred embodiment differs from the first preferred embodiment in that the adhesive layer 24 further includes a dye 2212. Thus, the position of the adhesive layer 24 can be clearly observed from the writing surface 211 of the note sheet 20, thereby making it possible to avoid touching the adhesive layer 24 which may reduce the adhesion ability of the adhesive layer 24. Besides, by virtue of the color of the dye, the note sheet 20 can be exactly stuck to an object without malposition. Of course, more than two dyes can be used to exhibit a colorful image on the substrate.

In summary, by forming the adhesive layer 24 in the central portion 22 to be spaced apart from the outer periphery 231 of the peripheral portion 23, the stress will not accumulate at an edge of the substrate 21. Thus, the warp problem of the note sheet 20 can be alleviated. Besides, the adhesive layer 24 surrounds a relatively large area in this invention, i.e., the adhesive layer 24 has a relatively large enclosing percentage, thereby also alleviating the warp problem of the note sheet 20 and improving adhesion ability of the note sheet 20.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A note pad, comprising:
a stack of note sheets each of which is tearable from said note pad in a tearing direction and capable of reducing warpage, and each of which includes:
a substrate having a writing face and a back face opposite to said writing face, said back face having a central re-adherable portion and a peripheral portion surrounding said central re-adherable portion; and
a rounded loop-shaped adhesive layer formed on said central re-adherable portion of said back face to permit said substrate together with said rounded loop-shaped adhesive layer to be releasably attachable and to alleviate a warp problem of said note sheet when said note sheet is torn off from said stack of said note sheets, wherein the rounded loop-shaped adhesive layer has a predetermined surface area out of the surface area of said back face.

2. A note pad, comprising:
a stack of note sheets each of which is tearable from said note pad in a tearing direction and capable of reducing warpage, and each of which includes:
a substrate having a writing face and a back face opposite to said writing face, said back face having a central re-adherable portion and a peripheral portion surrounding said central re-adherable portion; and
an adhesive layer formed on said central re-adherable portion of said back face to permit said substrate together with said adhesive layer to be releasably attachable, wherein said adhesive layer has a predetermined surface area out of the surface area of said back face, said substrate having a dimension such that if said adhesive layer is of a strip shape, said substrate would exhibit warpage when being torn from said note pad and adhered to a surface of an article, and if said adhesive layer is a rounded loop-shaped adhesive layer, said substrate exhibits no or reduced warpage when being torn from said note pad and adhered to a surface of an article, wherein
said adhesive layer is the rounded loop-shaped adhesive layer.

3. The note pad of claim 2, wherein said rounded loop-shaped adhesive layer includes a plurality of colloid particles having an average particle size ranging from 30 to 120 microns.

4. The note pad of claim 2, wherein said rounded loop-shaped adhesive layer includes a non-particle adhesive gel.

5. The note pad of claim 2, wherein a percentage of an area of said central re-adherable portion based on a total area of said back face ranges from 20% to 99%.

6. The note pad of claim 2, wherein said peripheral portion has an outer periphery, a shortest distance between said outer periphery and a center of said back face being greater than 10 mm, a shortest distance between said outer periphery of said peripheral portion and said central re-adherable portion being greater than 5 mm.

7. The note pad of claim 2, wherein said rounded loop-shaped adhesive layer includes a dye.

8. The note pad of claim 2, wherein said rounded loop-shaped adhesive layer includes a pressure-sensitive adhesive.

9. The note pad of claim 2, wherein said substrate together with said rounded loop-shaped adhesive layer is configured to be releasably attached to said writing face of a next one of said note sheets.

* * * * *